United States Patent Office 2,824,059
Patented Feb. 18, 1958

2,824,059

CORROSION INHIBITOR COMPOSITION AND METHOD OF PREVENTING CORROSION

Walter M. Chamot, Argo, Ill., assignor to National Aluminate Corporation, Chicago, Ill., a corporation of Delaware No Drawing. Application February 8, 1954
Serial No. 408,987

8 Claims. (Cl. 252—8.55)

This invention relates to the inhibition of corrosion of metals, and particularly to a new and improved composition useful in preventing corrosion of iron, steel and ferrous alloys. The invention is especially concerned with a composition and method for inhibiting corrosion of oil and gas well equipment and, more particularly, with the provision of a composition in the form of a weighted solid stick which may be provided in the production zone of a well, for example, by introducing the stick into the well at the surface and allowing it to fall to the well bottom. The stick disintegrates and becomes dissolved or dispersed in the fluid at the well bottom, and the active material is carried by the fluid into contact with the various metal surfaces of the well.

It is an object of the invention to provide a new and improved composition and method for inhibiting corrosion of oil and gas well equipment, particularly where it heretofore has been difficult or impossible to effectively inhibit corrosion.

Another object is to provide a composition and method furnishing advantages over prior compositions and methods and overcoming disadvantages of the latter.

A further object is to provide a composition furnishing better inhibition of corrosion while preventing excessive formation of water-oil emulsions in high pressure petroleum wells, for example.

A still further object is to provide a composition of the type described in the form of a solid stick which is resistant to the atmospheric conditions normally encountered and which is particularly advantageously employed under the various conditions encountered in oil and gas wells.

Yet another object is to provide a composition and method which will provide lasting protection against corrosion in wells, to result in a decrease in inhibitor requirements and even permitting cessation of treatment for long periods of time.

A number of compositions and methods have been proposed previously for reducing well equipment corrosion, and particularly, a solid form of inhibitor having a density of about 1 or less was employed. It was found, however, that the desired results were not obtained in many instances with such a composition and it was especially desired to increase the density of the composition for rapid introduction into the well bottom. Weighted compositions were therefore proposed to meet this need. It was found that the problem was complex, and a relatively closely defined composition consisting of five components was proposed as the solution. This composition included a corrosion inhibitor, a weighting material, an amorphous high melting mineral wax, an organic solvent-soluble cellulose derivative, and a thermoplastic, nonsaponifiable hydrocarbon resin melting over 225° F. Another proposed composition consisted of a corrosion inhibitor, a weighting material, an oxidized mineral wax having a saponification value between 50 and 180, and, in some cases, a toughening polymeric material. These compositions provided sticks having densities of about 1.5 to 2.2.

It has now been found, however, that a very useful high density corrosion inhibitor composition is prepared from a corrosion inhibiting material, an unoxidized wax-like material, and a weighting material. At times, it is advantageous to include a dispersant. No other ingredients need be incorporated in the composition. The composition provides excellent inhibition of corrosion and is especially valuable in that it does not promote water-oil emulsions, as occurred in use with prior compositions. Also, the preferred composition appears to act to clean out the equipment.

The composition in stick form has the various general physical and chemical properties required for transportation, storage and use, and it is relatively slowly disintegrated in a hydrocarbon liquid at the temperatures encountered yet it disintegrates and the ingredients dissolve or disperse sufficiently rapidly to provide rapid effective action and avoid an accumulation of the composition. It has a density of about 2.2 or greater and is thus very well adapted for rapid introduction into the production zone of a well.

There is also provided a method for inhibiting corrosion of well equipment which involves providing the new composition in the production zone of a well in an amount effective to reduce corrosion substantially. The composition is introduced intermittently as required, relatively frequently at the start of treatment and at longer intervals as treatment progresses, to a point where treatment may often be discontinued for periods as long as several months.

The corrosion inhibiting material is water and oil dispersible, by which is meant that it is soluble or capable of being dispersed in the stricter sense of forming a heterogeneous mixture with the liquid. A number of corrosion inhibitors are known to provide the desired result and may be employed, preferably the organic basic amino corrosion inhibiting compounds. It is especially preferred to employ one of the compounds described in U. S. Patent 2,659,731 to Luvisi, the disclosure of which is incorporated herein by reference. These compounds have the general formula

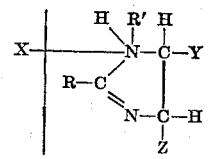

wherein X is the negative radical of a carbocyclic monocarboxy acid, R is a higher aliphatic hydrocarbon radical containing at least 11 carbon atoms, R' and Y are from the group consisting of hydrogen and lower aliphatic groups containing not more than 6 carbon atoms and Z is from the group consisting of hydrogen and lower alkyl groups containing not more than 6 carbon atoms. X is preferably also a radical of an acid from the group consisting of mono- and di- carbocyclic acids in which the carbocyclic structure is from the group consisting of 5-membered and 6-membered carbon rings, and R also preferably contains 17 carbon atoms in an acyclic chain. R' and Y are preferably saturated groups. These compounds are referred to generally as carbocyclic monocarboxy acid salts of glyoxalidines or substituted imidazolines. The salts are viscous liquids or soft greases soluble or dispersible in water and generally so in aromatic oil.

As set forth in the above patent, exemplary carboxy acids that may be used to prepare the salts are benzoic acid, 4-chlorobenzoic acid, 2,4-dichlorobenzoic acid, salicylic acid, cinnamic acid, 3,5-dinitrobenzoic acid, 2-nitrobenzoic acid, 3-nitrobenzoic acid, ortho cresotinic acid, anthranilic acid, phenylacetic acid, 2-chlorobenzoic acid, 4-chlorobenzoic acid, phenoxyacetic acid, 2,4-dichlorophenoxyacetic acid, 2,4,5-trichlorophenoxyacetic acid, pentachlorophenoxyacetic acid, naphthenic acids and 2,4-dichlorobenzoic acid.

Examples of glyoxalidines that may be reacted with any of the foregoing acids in preparing these salts are: 1-(2-aminoethyl)-2-heptadecenyl glyoxaldine, 1-(2-hydroxyethyl)-2-heptadecenyl glyovaldine, 4-methyl-2-heptadecenyl glyoxalidine, 1-(2-(2-aminoethyl)-aminoethyl)-2-haptadecenyl glyoxalidine, 1-(2-aminoethyl)-2-undecyl glyoxalidine, 1-(2-hydroxyethyl)-2-undecyl glyoxalidine, 4-methyl-2-undecyl glyoxalidine, 1-(2-(2-aminoethyl)-aminoethyl)-2-undecyl glyoxalidine, 1-(2-aminoethyl)-2-tridecyl glyoxalidine, 1-(2-hydroxyethyl)-2-tridecyl glyoxalidine, 4-methyl-2-tridecyl glyoxalidine, 1-(2-(2-aminoethyl)-aminoethyl)-2-tridecyl glyoxalidine, 1-(2-aminoethyl)-2-pentadecyl glyoxalidine, 1-(2-hydroxyethyl)-2-pentadecyl glyoxalidine, 4-methyl-2-pentadecyl glyoxalidine and 1-(2-(2-aminoethyl)-aminoethyl)-2-pentadecyl glyoxalidine.

The unoxidized wax-like material employed as the binder or vehicle must be inert to the foregoing active ingredient or inhibitor and have the requisite adhesive properties to bind the inhibitor and the weighting material in a suitable stick. Its melting point should be below the decomposition point of the inhibitor, to provide for preparation of the stick. At the same time, its melting point and solution properties must provide for relatively slow disintegration in oil mixtures so that the stick reaches the well bottom for the most part intact, but rapid enough to become effective soon after introduction in the well production zone. Thus, a cylindrical stick of about 1⅜ inches diameter and 17 inches long should not disintegrate in petroleum oil mixtures within about ½ to 2 hours, depending upon the well conditions and conditions of introduction, but should become dispersed as soon as possible thereafter. The softening and melting points of the stick are in general determined by those of the wax-like material. It is preferred to provide a relatively low softening point above about 135° F. for use in cold wells, and it is preferred to provide a softening point above about 170° F. for use in wells of relatively high temperature.

Mineral waxes and certain other wax-like materials may be employed. Especially preferred are the mineral waxes, including paraffin wax and microcrystalline waxes from petroleum, such as those from lubricating oil distillates and distillation residues and from crude oil or tank bottoms. Preferably, the saponification number and acid value of the wax are each less than about 1, it being further preferred that the saponification number be less than 0.5 and the acid value less than 0.1.

Numerous wax-like materials which may be used in the invention are commercially available, such as the following having the properties listed:

SHELL WAX MX-170 (SHELL OIL COMPANY).—MICROCRYSTALLINE WAX

| | Specifications | Typical Product |
|---|---|---|
| Gravity, A. P. I. at 210° F | | 47.4 |
| Gravity, specific at 60° F | | 0.935 |
| Flash, °F | | 585 |
| Melting Point, °F, (D-127-30) | 170—185 | 179.8 |
| Needle Penetration at 77° F | Max. 15 | 10 |
| Viscosity, S. S. U. at 210° F | | 76 |
| Oil Content Percent w. (Micro ASTM) | Max. 1.0 | 0.5 |
| Refractive Index at 80° C | | 1.4471 |
| Saponification No | | 0.2 |
| Acid value | | Less than .05 |

CONOCO COMPOSITE CYCLE WAX, LIGHT INTERMEDIATE BLEND (CONTINENTAL OIL CO.)

Light intermediate blend
Melting point, °F. AMP _____ 140–141
Oil Content _____ .5 to 1%
Flash, °F. COC _____ Over 400

LX–509 NEVINDENE (NEVILLE CHEMICAL COMPANY).—POLYINDENE RESIN

*Properties*

Softening point (ball and shouldered ring) ° C. Min _____ 155.
Melting point (cube-in-mercury) °C. Min. _____ 185.
Solubility _____ Insoluble in boiling Stoddard solvent and boiling mineral oil.
Molecular weight, average _____ 1200.

A suitable finely divided weighting material is included in the composition. It should be chemically inert towards the other ingredients, especially the inhibitor, and it should be of high density. It should be capable of even distribution throughout the stick and should not affect the other desirable physical properties of the stick, nor significantly affect its melting point or solution or dispersion characteristics. It should of course be non-corrosive and not toxic. It should be otherwise generally compatible in the composition and in use. Weighting material such as barium sulfate, barium oxide, lead oxide, preferably litharge, and lead are desirably used, it being preferred to employ barium sulfate.

It is often advantageous to include a dispersant for the corrosion inhibitor and the weighting material, to provide an homogeneous stick. Solid polyalkylene glycols, especially those of high molecular weight, are very effective for this purpose. The dispersant should have a melting point equal to or greater than that desired for the stick. Examples of suitable dispersants are Carbowax compound 6000 (Carbide and Carbon Chemicals Company), and Acrawax C (Glyco Products Company, Inc., Brooklyn, N. Y.). These compositions have the following representative properties:

CARBOWAX 6000.—POLYETHYLENE GLYCOL

Average molecular weight _____ 6000–7500
Melting point, ° C _____ 58–63
Water solubility at 20° C., by weight _____ Approx. 50
Saybolt viscosity at 210° F., sec _____ 3200–4200
Flash point, °F. Cleveland open cup _____ 480

ACROWAX C.—WATER-INSOLUBLE SYNTHETIC WAX

Melting point, °C _____ 140–143
Flash point, °C _____ 285
Specific gravity at 25° C _____ 0.97
Acid value _____ Less than 10

A minor effective amount of the corrosion inhibiting material is preferably employed together with a minor binding proportion of the wax-like material and a major proportion of the weighting material. Where employed, a minor effective amount of a dispersant is present. It is further preferred to provide about 8–12% of corrosion inhibitor, about 8–12% of wax-like material, about 3–12% of dispersant when employed, and the balance of weighting material, thus preferably about 65–85%.

In preparing the stick composition, the inhibitor, wax-like material and dispersant are mixed and heated until molten, the weighting material is then added and the mixture is stirred until homogeneous. The material is then poured into a mold and allowed to cool, when it is removed for use. As is apparent, the stick could be prepared in other ways. A representative preferred stick size is 1⅜ inches diameter by 17 inches, in a cylindrical stick. Other sizes and shapes can of course be employed.

The following examples are furnished to assist in providing a complete understanding of the invention, but it is to be understood that the invention is not limited thereto nor to the specific compositions, proportions and procedures set forth therein, which are given only for purposes of illustration. In the examples, the parts are by weight.

EXAMPLE 1

A stick type corrosion inhibitor of the following composition was prepared:

| | Parts |
|---|---|
| 1 - (2-hydroxyethyl) - 2 - heptadecenyl glyoxalidine salicylate | 10 |
| Barium sulfate | 70 |
| Shell wax MX-170 | 10 |
| Carbowax 6000 | 10 |

The Shell wax and Carbowax quantities could be increased or decreased 2 parts without greatly changing the physical characteristics of the stick.

The Carbowax and Shell wax and the salicylate were mixed and heated at 300° F. until molten. The barium sulfate was then added with stirring, and agitation was continued until the mixture was homogeneous. The mixture was then poured into a cylindrical mold and allowed to cool.

The resulting stick was not waxy or easily broken, and had a density of 2.2. Its softening point was about 135° F. (the temperature at which the stick became tacky and adhered to a glass rod touched to its surface). Its deformation temperature was about 143° C. (the temperature at which the stick began to melt and lose its shape). The stick disintegrated entirely in a week at room temperature in a petroleum-water mixture (50-50). This stick is well suited for use in wells having low temperatures.

EXAMPLE 2

The procedure of Example 1 was repeated, employing the following ingredients:

| | Parts |
|---|---|
| Inhibitor of Example 1 | 10 |
| Barium sulfate | 76.25 |
| Shell wax MX-170 | 10. |
| Acrawax C, bead form | 3.75 |

The resulting inhibitor stick had a density slightly greater than 2.3, a softening point of about 175° F. and a deformation temperature greater than about 190° F. This stick is very well suited for the intended purpose, and in particular, the stick is especially useful in high temperature wells, due to its high softening temperature.

EXAMPLE 3

The procedure of Example 1 was repeated, employing the following ingredients:

| | Parts |
|---|---|
| Inhibitor of Example 1 | 10 |
| Barium sulfate | 70 |
| Acrawax C | 10 |
| Conoco composite cycle wax, light intermediate blend | 10 |

The resulting stick had a density of about 2.3, a softening temperature of about 174° F., and a deformation temperature of about 201° F. The stick had a considerably lower disintegrability in kerosene than did that of Example 2.

A stick similar to that of Example 2 in strength, softening temperature and disintegrability in kerosene was prepared from the following ingredients:

| | Parts |
|---|---|
| Inhibitor of Example 1 | 10 |
| Barium slufate | 76.25 |
| Acrawax C | 3.75 |
| Conoco composite cycle wax light intermediate blend | 10 |

EXAMPLE 4

The procedure of Example 1 was repeated, except that the mixture was heated at 400° F., employing the following ingredients:

| | Parts |
|---|---|
| Inhibitor of Example 1 | 10 |
| Barium sulfate | 80 |
| LX-509 Nevindene | 10 |

The resulting stick had a density of 2.6, a softening temperature of 208° F., and a deformation temperature of 217° F. The stick had a considerably lower disintegrability in kerosene than did that of Example 2.

In application, the corrosion inhibitor stick of Example 1, for example, is used where well temperature conditions are relatively low, and the stick of Example 2, for example, is used where the temperature conditions are relatively high. In oil wells, one method of treatment found to be very advantageous involves providing about 1½ sticks per 1000 feet of well depth on the first day of treatment in the production zone or well bottom. For about the next 4 weeks, 2 sticks are added per 55 barrels of fluid produced. A film of inhibitor forms on the various metal parts during this period. Addition can then be reduced to about 1 stick per 220 barrels of fluid and at times to a lower quantity. Protection against corrosion is determined during operation, one method being to determine the iron content of the water, and the dosage may be increased or decreased as indicated.

In the treatment of gas wells, about 1½ sticks per 1000 feet of well depth are introduced on the first day of treatment. For about the next 4 weeks, about 1 stick per 1,000,000 cubic feet of gas produced is added. Subsequent addition may be made at the rate of about 1 to ⅕ of a stick per 1,000,000 cubic feet of gas, based on the corrosion encountered.

It has been found that the foregoing treatment results in better corrosion inhibition than formerly. The composition has been found to be especially advantageous in that it does not promote water-oil emulsions, and it apparently acts to clean out the parts of the well equipment. Tubing pumps, sucker rods, well head equipment, etc., are well protected by the treatment. It has been found that after operation over a period of time, it is possible to stop the treatment for relatively long periods of time, as long as several months, while still maintaining reduced corrosion. Inhibitor sticks are then added intermittently as required, and it is found that but a small quantity of sticks need be added intermittently to obtain the desired corrosion control.

The invention is hereby claimed as follows:

1. A corrosion inhibitor composition consisting essentially of in proportions by weight about 8–12% of a water and oil dispersible corrosion inhibiting material, about 8–12% of an unoxidized mineral wax, about 3–12% of a high molecular weight solid polyalkylene glycol dispersant, and a major proportion of a weighting material, in solid stick form.

2. A corrosion inhibitor composition consisting essentially of in proportions by weight about 8–12% of a compound having the general formula

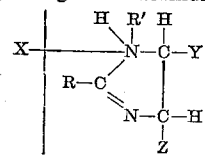

wherein X is the negative radical of a carbocyclic monocarboxy acid, R is a higher aliphatic hydrocarbon radical containing at least 11 carbon atoms, R' and Y are from the group consisting of hydrogen and lower aliphatic groups containing not more than 6 carbon atoms and Z is from the group consisting of hydrogen and lower alkyl groups containing not more than 6 carbon atoms, about 8–12% of a binder consisting essentially of an unoxidized mineral wax, about 3–12% of a high molecular weight solid polyalkylene glycol dispersant, and a major proportion of a weighting material, in solid stick form.

3. A corrosion inhibitor composition consisting essentially of in proportions by weight about 8–12% of a water and oil dispersible organic basic amino corrosion inhibiting compound, about 8–12% of a binder consisting essentially of an unoxidized mineral wax, about 3–12% of a high molecular weight solid polyalkylene glycol dispersant, and a major proportion of barium sulfate, in solid stick form.

4. A corrosion inhibitor composition consisting essentially of in proportions by weight about 8–12% of a water and oil dispersible organic basic amino corrosion inhibiting compound, about 8–12% of a binder consisting essentially of an unoxidized mineral wax, about 3–12% of a high molecular weight solid polyalkylene glycol dispersant, and a major proportion of a weighting material, in solid stick form.

5. A corrosion inhibitor composition consisting essentially in proportions by weight of about 8–12% of the salicylic acid addition salt of 1-(2-hydroxyethyl)-2-heptadecenyl-glyoxalidine, about 8–12% of an unoxidized mineral wax, about 3–12% of a high molecular weight solid polyalkylene glycol dispersant, and a major proportion of barium sulfate, in solid stick form.

6. A method of inhibiting corrosion of oil and gas well equipment which comprises providing the corrosion inhibitor composition of claim 1 in the production zone of a well in an amount effective to reduce corrosion substantially.

7. A method of inhibiting corrosion of oil and gas well equipment which comprises providing the corrosion inhibitor composition of claim 5 in the production zone of a well in an amount effective to reduce corrosion substantially, said amount being maximal at the start of treatment and being regulated thereafter by intermittent addition of the composition in accordance with the amount of corrosion taking place.

8. A corrosion inhibitor composition consisting essentially in proportions by weight of about 8–12% of a water and oil dispersible organic basic amino corrosion inhibiting compound, about 8–12% of an unoxidized mineral wax having a saponification number less than about 1 and an acid value less than about 1, about 3–12% of a high molecular weight solid polyalkylene glycol dispersant, and the balance of a weighting material, in solid stick form.

References Cited in the file of this patent
UNITED STATES PATENTS

| | | |
|---|---|---|
| 2,466,517 | Blair et al. | Apr. 5, 1949 |
| 2,466,530 | Blair et al. | Apr. 5, 1949 |
| 2,468,163 | Blair et al. | Apr. 26, 1949 |
| 2,599,384 | Gross et al. | June 3, 1952 |
| 2,599,385 | Gross et al. | June 3, 1952 |
| 2,640,029 | Blair et al. | May 26, 1953 |
| 2,649,415 | Sundberg et al. | Aug. 18, 1953 |
| 2,659,731 | Luvisi | Nov. 17, 1953 |